US009277609B2

(12) United States Patent
Knoedgen

(10) Patent No.: US 9,277,609 B2
(45) Date of Patent: Mar. 1, 2016

(54) BACK-UP CAPACITOR

(71) Applicant: Dialog Semiconductor GmbH, Kirchheim/Teck-Nabern (DE)

(72) Inventor: Horst Knoedgen, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 150 days.

(21) Appl. No.: 14/109,178

(22) Filed: Dec. 17, 2013

(65) Prior Publication Data

US 2014/0167640 A1    Jun. 19, 2014

(30) Foreign Application Priority Data

Dec. 18, 2012   (EP) .................................... 12197750

(51) Int. Cl.
| H05B 37/00 | (2006.01) |
| H05B 39/00 | (2006.01) |
| H05B 41/14 | (2006.01) |
| H05B 33/08 | (2006.01) |
| H02M 3/158 | (2006.01) |
| H02M 1/36 | (2007.01) |
| H02M 1/42 | (2007.01) |
| H02M 3/335 | (2006.01) |
| H02M 1/00 | (2007.01) |

(52) U.S. Cl.
CPC ............. *H05B 33/0815* (2013.01); *H02M 1/36* (2013.01); *H02M 3/158* (2013.01); *H02M 1/4225* (2013.01); *H02M 3/33523* (2013.01); *H02M 2001/007* (2013.01); *H02M 2001/0096* (2013.01); *Y02B 20/19* (2013.01); *Y02B 20/346* (2013.01); *Y02B 20/383* (2013.01); *Y02B 70/126* (2013.01)

(58) Field of Classification Search
USPC .................................................. 315/209–245
See application file for complete search history.

(56) References Cited

U.S. PATENT DOCUMENTS

| 6,008,593 | A | * | 12/1999 | Ribarich | ........................ 315/307 |
| 6,127,786 | A | * | 10/2000 | Moisin | ........................... 315/291 |
| 7,298,099 | B2 | * | 11/2007 | Ribarich | ........................ 315/308 |
| 2005/0225265 | A1 | * | 10/2005 | Ribarich | ........................ 315/291 |

(Continued)

FOREIGN PATENT DOCUMENTS

WO    WO 01/60127    8/2001

OTHER PUBLICATIONS

European Search Report, 12197750.8-1805, Mailed: May 21, 2013.

*Primary Examiner* — Brandon S Cole

(74) *Attorney, Agent, or Firm* — Saile Ackerman LLC; Stephen B. Ackerman

(57) ABSTRACT

This invention relates to driver circuits used within high voltage power supplies, e.g. for light bulb assemblies. A driver circuit providing electrical energy at an output derived from electrical energy at an input is described. The driver circuit comprises a power converter, a controller, a supply voltage capacitor, and is configured to provide a supply voltage to the controller. A start-up resistor is coupled to the input of the driver circuit, charges the supply voltage capacitor, and is coupled to the supply voltage capacitor during start-up of the driver circuit. A back-up capacitor is coupled to the output of the driver circuit and with the supply voltage capacitor if a voltage at the back-up capacitor exceeds the supply voltage by a forward voltage threshold, and is decoupled from the supply voltage capacitor if the supply voltage exceeds the voltage at the back-up capacitor by a reverse voltage threshold.

21 Claims, 6 Drawing Sheets

(56) References Cited

U.S. PATENT DOCUMENTS

| | | |
|---|---|---|
| 2007/0236966 A1 | 10/2007 | Uruno et al. |
| 2009/0167260 A1* | 7/2009 | Pauritsch et al. ............. 323/233 |
| 2009/0289557 A1* | 11/2009 | Itoh et al. ...................... 315/127 |
| 2010/0327765 A1* | 12/2010 | Melanson et al. ............ 315/291 |
| 2011/0012530 A1* | 1/2011 | Zheng et al. .................. 315/294 |
| 2012/0146594 A1 | 6/2012 | Kobayashi |
| 2012/0274227 A1* | 11/2012 | Zheng et al. .................. 315/210 |
| 2013/0234621 A1* | 9/2013 | Athalye ........................ 315/307 |
| 2014/0021874 A1* | 1/2014 | Chen ......................... 315/200 R |
| 2014/0210377 A1* | 7/2014 | Knoedgen .................... 315/307 |
| 2014/0252989 A1* | 9/2014 | Knoedgen et al. ........... 315/307 |

\* cited by examiner

BACK-UP CAPACITOR

TECHNICAL FIELD

The present document relates to power supplies. In particular, the present document relates to driver circuits used within high voltage power supplies, e.g. for light bulb assemblies.

BACKGROUND

A power supply, e.g. a power supply for light bulb assemblies, should exhibit short start-up times, in order to allow for a quick start-up of the device coupled to the power supply, e.g. of the light bulb assembly. Such a power supply may be configured to convert electrical energy from a mains supply to electrical energy at a pre-determined voltage level. The power supply should be configured to bridge brief interruptions of the mains supply, in order to prevent any interruptions of the energy supplied to the device coupled to the power supply. By way of example, in case of a light bulb assembly, a brief interruption of the electrical energy may cause an undesirable visible interruption of the light emitted by the light bulb assembly.

A possible way of enabling the power supply to bridge brief interruptions of the mains supply could be to use capacitors with a high capacitance for providing a supply voltage to integrated circuits of the power supply. However, the use of capacitors having a high capacitance typically leads to increased start-up times of the power supply which is not desirable. Furthermore, additional start-up transistors may be used within the power supply. However, such start-up transistors lead to additional components for the power supply, thereby increasing the cost of the power supply.

The present document addresses the above mentioned technical problem and describes a driver circuit and/or power supply which allows for short start-up times and prolonged bridging of interruptions of the mains supply at reduced implementation costs.

SUMMARY

According to an aspect of the invention, a driver circuit (or a power supply) is described. The driver circuit is configured to provide, at an output of the driver circuit, electrical energy at a drive voltage. The electrical energy at the drive voltage is derived from electrical energy at an input voltage at an input of the driver circuit. By way of example, the driver circuit may be configured to receive electrical energy at its input (e.g. from a mains supply such that the input voltage may correspond to a rectified mains voltage) and convert the electrical energy into electrical energy at a pre-determined voltage level (the drive voltage). In particular, the driver circuit may provide electrical energy to a solid state lighting (SSL) light source such as an LED or an OLED. The drive voltage may e.g. be the on-voltage of the light source.

The driver circuit may comprise a power converter configured to convert the electrical energy at the input voltage into the electrical energy at the drive voltage. The power converter may comprise a switched-mode power converter, e.g. a boost converter, a buck converter, a buck-boost converter, a SEPIC converter and/or a flyback converter. Furthermore, the power converter may comprise a plurality of converter stages, wherein each converter stage may comprise a switched-mode power converter. The power converter may comprise one or more power switches (e.g. transistors such as metaloxide semiconductor field effect transistors).

Furthermore, the driver circuit may comprise a controller configured to control the one or more power switches such that the power converter provides the electrical energy at the drive voltage. By way of example, the controller may control a commutation cycle rate and/or a duty cycle of the one or more power switches. The controller may be implemented as an integrated circuit (IC).

The driver circuit may comprise a supply voltage capacitor coupled to the controller and configured to provide a supply voltage to the controller. Furthermore, the driver circuit may comprise a start-up resistor which is coupled to the input of the driver circuit and which is configured to charge the supply voltage capacitor when coupled to the supply voltage capacitor. In particular, when coupled, the start-up resistor and the supply voltage capacitor may be arranged in series and the input voltage may be applied to the serial arrangement of start-up resistor and supply voltage capacitor. The start-up resistor may be coupled to the supply voltage capacitor during a start-up phase of the driver circuit, thereby charging the supply voltage capacitor and thereby providing the supply voltage to the controller. The start-up phase may be sufficiently long to ensure operation of the driver circuit. Subsequent to the start-up phase, the start-up resistor may be decoupled from the supply voltage capacitor and the supply voltage capacitor may be recharged via different means.

By way of example, the controller may comprise a start-up switch (e.g. a transistor). Furthermore, the controller may be configured to close the start-up switch during the start-up phase, in order to couple the start-up resistor to the supply voltage capacitor. In addition, the controller may be configured to open the start-up switch subsequent to the start-up phase, in order to decouple the start-up resistor from the supply voltage capacitor.

Furthermore, the driver circuit may comprise a back-up capacitor coupled to the output of the driver circuit and arranged to receive electrical energy from the output of the driver circuit. The back-up capacitor may be arranged to provide an additional charge for maintaining the supply voltage to the controller. At the same time, the back-up capacitor may be decoupled from the supply voltage capacitor in order to prevent a charging of the back-up capacitor via the start-up resistor.

For this purpose, the driver circuit may comprise a back-up switch (e.g. a transistor or a diode) configured to couple the back-up capacitor with the supply voltage capacitor if a voltage at the back-up capacitor exceeds the supply voltage by a forward voltage threshold (the forward voltage threshold may e.g. be zero or greater than zero). Furthermore, the back-up switch may be configured to decouple the back-up capacitor from the supply voltage capacitor if the supply voltage exceeds the voltage at the back-up capacitor by a reverse voltage threshold (the reverse voltage threshold may be zero or greater than zero). By way of example, the back-up switch may comprise a diode which is forward biased if the voltage at the back-up capacitor exceeds the supply voltage and reverse biased if the supply voltage exceeds the voltage at the back-up capacitor.

As such, a driver circuit is described which comprises a supply voltage capacitor and a separate back-up capacitor. The supply voltage capacitor may be designed to be sufficiently small in order to allow for a short start-up time of the controller and the driver circuit. On the other hand, the back-up capacitor may be designed to be sufficiently large in order to enable the driver circuit to bridge an interruption of the input voltage having a pre-determined duration.

The power converter may comprise a transformer configured to galvanically decouple the electrical energy at the input voltage from the electrical energy at the drive voltage using an electromagnetically coupled primary and secondary winding. Typically, the secondary winding is electrically coupled to a load (e.g. a light source) of the driver circuit. The primary winding receives the electrical energy from the input of the driver circuit and forwards some or all of the electrical energy through electromagnetic coupling to the secondary winding.

The transformer may comprise an additional auxiliary winding which is electromagnetically coupled with the primary winding of the transformer. As such, the auxiliary winding may receive some or all of the electrical energy through electromagnetic coupling from the primary winding of the transformer. The back-up capacitor may be electrically coupled to the auxiliary winding and therefore be charged using electrical energy coming from the auxiliary winding. The back-up capacitor may be coupled to the auxiliary winding via a first discharging switch (e.g. comprising or e.g. implemented as a first discharging diode) configured to prevent a discharging of the back-up capacitor via the auxiliary winding. On the other hand, the discharging switch typically enables a charging of the back-up capacitor (in the forward direction of the diode).

The driver circuit may be configured to allow for a charging of the supply voltage capacitor via the auxiliary winding subsequent to the start-up phase. For this purpose, the supply voltage capacitor may be coupled to the auxiliary winding via a supply voltage switch configured to control a charging level of the supply voltage capacitor. The supply voltage switch may be an internal switch (e.g. an internal transistor) of the controller. Furthermore, the supply voltage capacitor may be coupled to the auxiliary winding via a second discharging switch (e.g. comprising or e.g. implemented as a second discharging diode) configured to prevent a discharging of the supply voltage capacitor via the auxiliary winding (e.g. in the reverse direction of the second discharging diode).

The driver circuit may be configured to provide the electrical energy at the drive voltage to a solid state lighting light source (e.g. to a plurality of LEDs or OLEDs). The controller may be configured to operate the power converter according to a plurality of different operation states corresponding to a plurality of different illumination states of the light source. Examples for illumination states are e.g. an "off" state with no illumination, an "on" state with a maximum illumination level, a "dim up" state with a smoothly increasing illumination level and a "dim down" state with a smoothly decreasing illumination level.

In particular, the controller may be configured to operate the driver circuit according to a current operation state and to detect one of a plurality of pre-determined events based on the input voltage. The plurality of pre-determined events may comprise an "off" event, an "off/on" event and an "on" event. Detecting the "off" event may comprise detecting that the input voltage lies below a pre-determined off-threshold for more than a pre-determined maximum time threshold. Detecting the "off/on" event may comprise detecting that the input voltage lies below the pre-determined off-threshold for more than a pre-determined minimum time threshold and for less than the pre-determined maximum time threshold. Detecting the "on" event may comprise detecting that the input voltage lies above a pre-determined on-threshold. The off-threshold may be lower than the on-threshold and the minimum time threshold may be shorter than the maximum time threshold.

The controller may be configured to determine a target operation state in accordance to a pre-determined state machine, based on the current operation state and based on the detected one of the plurality of pre-determined events.

The pre-determined state machine may define transitions between different operation states subject to detected events. Subsequent to determining the target operation state, the controller may be configured to operate the driver circuit in accordance to the target operation state.

As indicated above, the driver circuit may be configured to provide short start-up times and relatively long durations for bridging interruptions of the input voltage. The bridged time periods of interruptions may be used to detect "off/on" events, thereby enabling the control of different illumination states of a light source using short interruptions of the mains supply. By doing this, light bulb assemblies may be provided which can be dimmed using an on/off switch, without the need for a phase-cut dimmer.

The driver circuit may further comprise an output capacitor at the output of the driver circuit. The output capacitor may be configured to store an electrical charge to be provided to a load (e.g. the light source) of the driver circuit. The output capacitor may be arranged in parallel to the load. The driver circuit may be configured to transfer electrical energy from an inductor (e.g. the transformer) of the power converter to the output capacitor during an off-state of the power switch. The electrical charge of the output capacitor may be used to provide electrical energy to the load (e.g. during interruption of the input voltage).

According to a further aspect, a light bulb assembly is described. The light bulb assembly may comprise an electrical connection module configured to electrically connect to a mains power supply, thereby providing electrical energy at the input voltage. Furthermore, the light bulb assembly may comprise a driver circuit as described in the present document. The driver circuit may be configured to provide electrical energy at the drive voltage derived from the electrical energy at the input voltage. Furthermore, the light bulb assembly comprises a light source (e.g. a series of LEDs or OLEDs) configured to provide light using the electrical energy at the drive voltage.

According to another aspect, a method for operating a controller and/or a driver circuit as outlined in the present document is described. The method may comprise steps which correspond to the features of the controller and/or driver circuit described in the present document. In particular, the method may comprise converting electrical energy at an input voltage into electrical energy at a drive voltage using a power converter comprising a power switch. The method proceeds in controlling the power switch such that the electrical energy at the drive voltage is provided. Furthermore, the method comprises providing a supply voltage capacitor coupled to a controller and configured to provide a supply voltage to the controller. In addition, the method comprises providing a start-up resistor coupled to the input voltage and configured to charge the supply voltage capacitor when coupled to the supply voltage capacitor. The start-up resistor may be coupled to the supply voltage capacitor during a start-up phase. Furthermore, the method comprises providing a back-up capacitor coupled to the output of the driver circuit and arranged to receive electrical energy from the output of the driver circuit. The method may proceed in coupling the back-up capacitor with the supply voltage capacitor if a voltage at the back-up capacitor exceeds the supply voltage by a forward voltage threshold; and/or in decoupling the back-up capacitor from the supply voltage capacitor if the supply voltage exceeds the voltage at the back-up capacitor by a reverse voltage threshold.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

SHORT DESCRIPTION OF THE FIGURES

The invention is explained below in an exemplary manner with reference to the accompanying drawings.

DETAILED DESCRIPTION

The driver circuit described in the present document may be used in the context of power supplies in general. However, the driver circuit is particularly advantageous when used in conjunction with high voltage power supplies, e.g. used within light bulb assemblies. In the following, the invention is described in the context of such a light bulb assembly. It should be noted, however, that the invention is applicable to various other power supply applications.

In the present document, a light bulb "assembly" includes all of the components required to replace a traditional incandescent filament-based light bulb, notably light bulbs for connection to the standard electricity supply. In British English (and in the present document), this electricity supply is referred to as "mains" electricity, whilst in US English, this supply is typically referred to as power line. Other terms include AC power, line power, domestic power and grid power. It is to be understood that these terms are readily interchangeable, and carry the same meaning.

Typically, in Europe electricity is supplied at 230-240 VAC, at 50 Hz (mains frequency) and in North America at 110-120 VAC at 60 Hz (mains frequency). The principles set out in the present document apply to any suitable electricity supply, including the mains/power line mentioned, and a DC power supply, and a rectified AC power supply.

Figure 1:
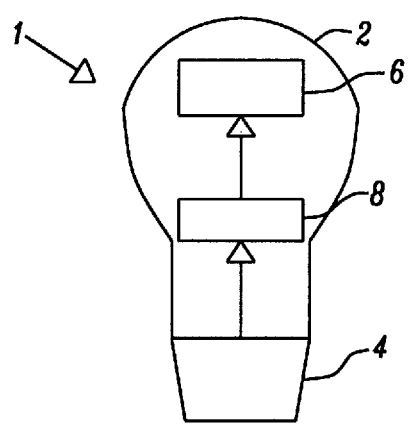
FIG. 1 illustrates a block diagram of an example light bulb assembly.

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 (also referred to as an illuminant) is provided within the housing 2. Examples for such light sources 6 are a CFL tube or a solid state light source 6, such as a light emitting diode (LED) or an organic light emitting diode (OLED) (the latter technology is referred to as solid state lighting, SSL). The light source 6 may be provided by a single light emitting diode, or by a plurality of LEDs.

Driver circuit 8 is located within the bulb housing 2, and serves to convert supply electricity received through the electrical connection module 4 into a controlled drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

The driver circuit 8 of a light bulb assembly 1 should be configured to provide a drive current to the light source 6 almost instantaneously, subsequent to turning on of the mains supply (e.g. subsequent to a user switching on the light). Consequently, the driver circuit 8 should exhibit a low start-up time. On the other hand, the driver circuit 8 should be configured to maintain operation, even when being subjected to short interruptions of the mains supply. In other words, the driver circuit 8 should be configured to bridge short interruptions of the mains supply. Such short interruptions (e.g. having a length of a pre-determined number of cycles of the mains supply) of the mains supply may be due to instabilities within the mains power supply network. Furthermore, such interruptions may be intentional brief interruptions (caused by a user turning off and on the light switch). Brief intentional interruptions of the mains supply may be used to control the behaviour of the light bulb assembly 1. By way of example, intentional interruptions of the mains supply may enable a user to control a dimming of the light bulb assembly 1 using an on/off light switch. The driver circuit 8 should be configured to maintain operation (and provide a drive current to the light source 6) during such brief (intentional or network caused) interruptions of the mains supply.

In the following, an example driver circuit 8 for a light bulb assembly 1 is described in more detail. In particular, a driver circuit 8 is described which may be used to control the dimming level of the light source 6 of the light bulb assembly 1, subject to intentional interruptions of the mains supply.

Figure 2:
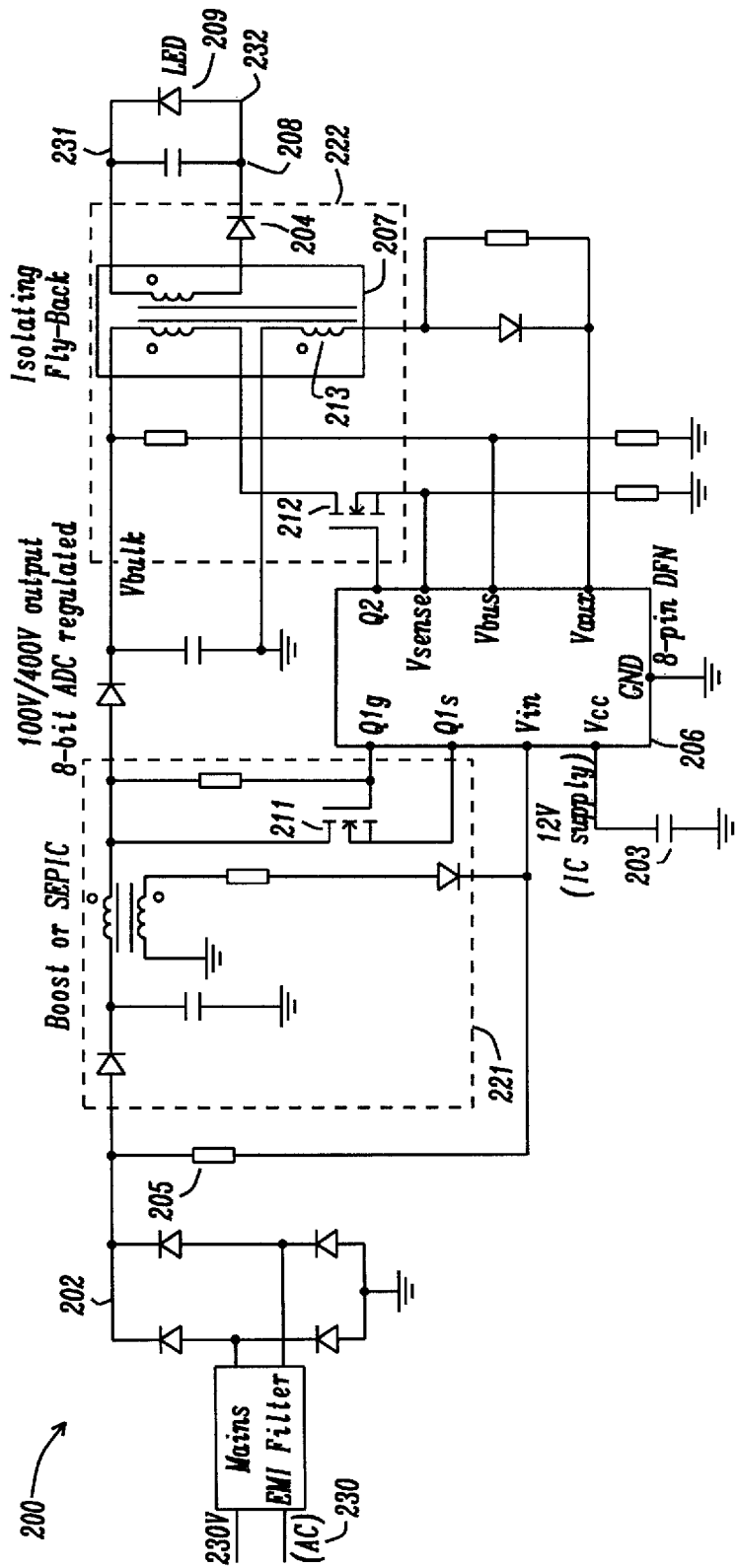
FIG. 2 shows a circuit diagram of an example driver circuit.

FIG. 2 illustrates a circuit diagram of an example driver circuit 200, 8 of a light bulb assembly 1. The driver circuit 200 comprises an electromagnetic interference (EMI) filter unit 201 and a rectifier 202, in order to generate a rectified voltage from the main supply 230. Furthermore, the driver circuit 200 comprises a controller 206 which is configured to control one or more power switches 211, 212 of one or more switched-mode power converters 221, 222. The controller 206 may be started using the start-up resistor 205. The start-up resistor 205 may be coupled via an internal connection within the controller 206 to the supply voltage capacitor 203 of the controller 206, thereby enabling the charging of the supply voltage capacitor 203. Once the supply voltage capacitor 203 has reached a sufficient charging level, the controller 206 can start operation.

In the illustrated example, the driver circuit 200 comprises a two-state power converter 221, 222 with the first stage 221 being a Boost converter and the second stage 222 being a flyback converter. The flyback converter comprises a transformer 207 having an additional auxiliary winding 213 for measurement purposes. The auxiliary winding 213 may be used to provide information to the controller 206 regarding the output voltage 231 (also referred to as the drive voltage) of the driver circuit 200. Furthermore, the driver circuit 200 comprises an output capacitor (or storage capacitor) 208 which stores electrical energy to be provided to the light source 6, 209. The driver circuit 200 is configured to provide the light source 209 with the drive voltage 231 (which corresponds e.g. to the on-voltage of an LED device) and with a drive current 232 (which may be controlled in order to control the illumination level of the light source 209).

The driver circuit 200 (and in particular the controller 206) may be configured to detect one or more events encoded within the mains voltage 230. By way of example, the mains voltage 230 may be submitted to a mains switch (e.g. an on/off switch) configured to provide and to interrupt the mains voltage 230. A brief intentional interruption of the mains voltage 230 (e.g. having a duration which exceeds a minimum number of cycles of the mains supply 230 and which is smaller than a maximum number of cycles of the mains supply 230) may be interpreted by the controller 206 as a so called "Off/On event". Furthermore, the controller may be configured to detect an "On event", subject to the mains switch being turned on, thereby providing the mains voltage 230. In addition, the controller may be configured to detect an "Off event", subject to an interruption of the mains voltage having a duration which exceeds the above mentioned maximum number of cycles of the mains supply 230.

The controller 206 may comprise a state machine (e.g. encoded as software, firmware or hardware). The state machine may define a plurality of illumination states of the light source 209, as well as events which trigger transitions between the illumination states. By way of example, the plurality of illumination states may comprise a "Hold" illumination state at a fixed illumination level, a "Max" illumination state at a maximum illumination level, an "Off" illumination state at zero illumination level, a "dim up" illumination state (where the illumination level is smoothly increased) and/or a "dim down" illumination state (where the illumination level is smoothly decreased).

The controller 206 may be configured to determine a target illumination state of the light source 209 starting from a current illumination state, in accordance to the pre-determined state machine. In particular, the controller 206 may be configured to define and adjust settings of the driver circuit 200 (e.g. the duty cycle of a power switch 211, 212), which control the respective behavior of the light source 209 for the corresponding illumination states. The settings of the driver circuit 200 (e.g. the length of the duty cycle of a power switch 211, 212) may be stored in a memory of the controller 206.

Figure 3:
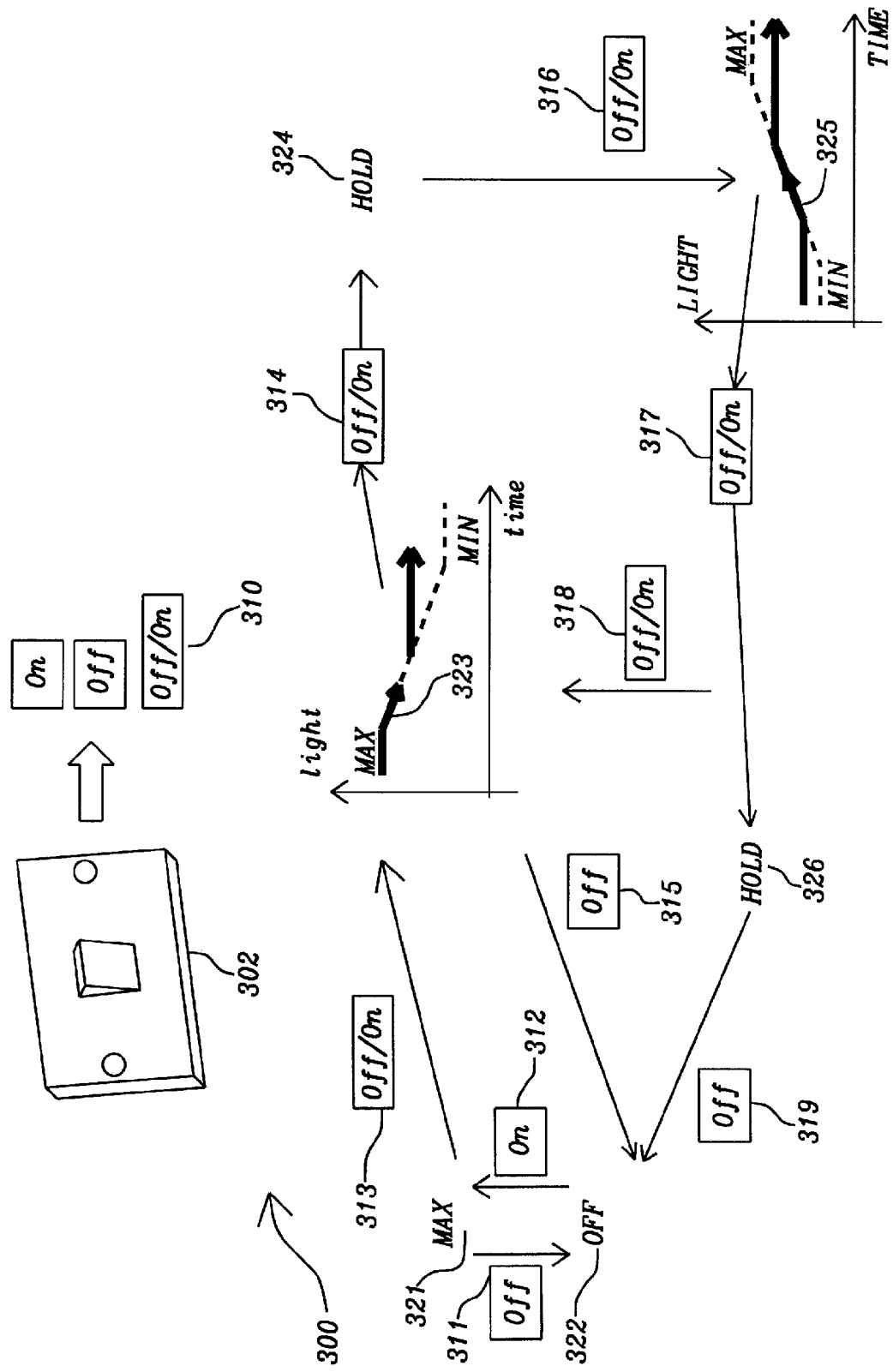
FIG. 3 illustrates an example method for enabling dimming of a light bulb assembly using a mains switch.

FIG. 3 illustrates a method 300 which makes use of a mains switch 302 as signaling means, in order to encode a plurality of events 310. The example events of FIG. 3 are an "ON" event, corresponding to a switch 302 which is kept on for a minimum pre-determined time interval; an "OFF event, corresponding to a switch 302 which is kept off for a minimum pre-determined time interval; and an "OFF/ON" event, corresponding to an event where the switch 302 is briefly switched from ON to OFF and then back to ON within a predetermined time interval. These three events in combination with various illumination states can be used to provide a dimming function (even when no phase-cut dimmer is available at the mains supply).

It can be seen from FIG. 3, how the ON event 312 can be used to change the driver circuit 200 from the state "OFF", i.e. no intensity, (reference numeral 322) to the state "MAX", i.e. maximum intensity, (reference numeral 321), and how the OFF event 311 can be used to perform the inverse change of states. When in the "MAX" state 321, the OFF/ON event 313 can be used to put the driver circuit 200, shown in FIG. 2, into a dim down state 323. The dim down state 323 triggers a smooth decrease in intensity down towards a minimum intensity (e.g. 20% intensity). Using another OFF/ON event 314, the dim down state 323 may be stopped, thereby putting the driver circuit 200 into a hold state 324 at the current intensity. When detecting another OFF/ON event 316, the driver circuit 200 is put into a dim up state 325, thereby smoothly increasing the intensity up to the maximum intensity. Another OFF/ON event 317 may again put the driver circuit 200 into a hold state 326 (which differs from the hold state 324 in that a subsequent OFF/ON event 318 will retrigger the dim down state 323, instead of the dim up state 325). Whenever detecting an OFF event 315, 319, the driver circuit 200 is put into the OFF state 322. In the example method 300 (and the corresponding example state machine of the controller 206), this OFF state 322 can only be left, when detecting an ON event 312.

In order to provide light bulb assemblies 1, which may be dimmed using the control method 300 illustrated in FIG. 3, the driver circuit 200 should be configured to bridge brief interruptions of the mains supply 230 (which are used to signal an "Off/on" event), without interrupting operation of the controller 206. This could be achieved by using a supply voltage capacitor 203 having an increased capacity, thereby extending the duration during which the supply voltage capacitor 203 can supply power to the controller 206. Typically, the controller 206 draws a current in the range of 50 µA. Consequently, a relatively large supply voltage capacitor 203 is required if an interruption of about 1 second duration is to be bridged. However, a large supply voltage capacitor 203 leads to increased start-up times which is in contradiction with the design requirement of providing a light bulb assembly 1 which emits light almost instantaneously, in response to turning on of the mains switch 302.

In the present document it is proposed to make use of a back-up capacitor in addition to the supply voltage capacitor 203. The back-up capacitor may be used to provide an additional charge, in order to maintain the operation of the controller 206 subsequent to an interruption of the mains voltage 230. As a result, the capacitance of the supply voltage capacitor 203 may be reduced, thereby allowing for reduced start-up times.

Figure 4A:
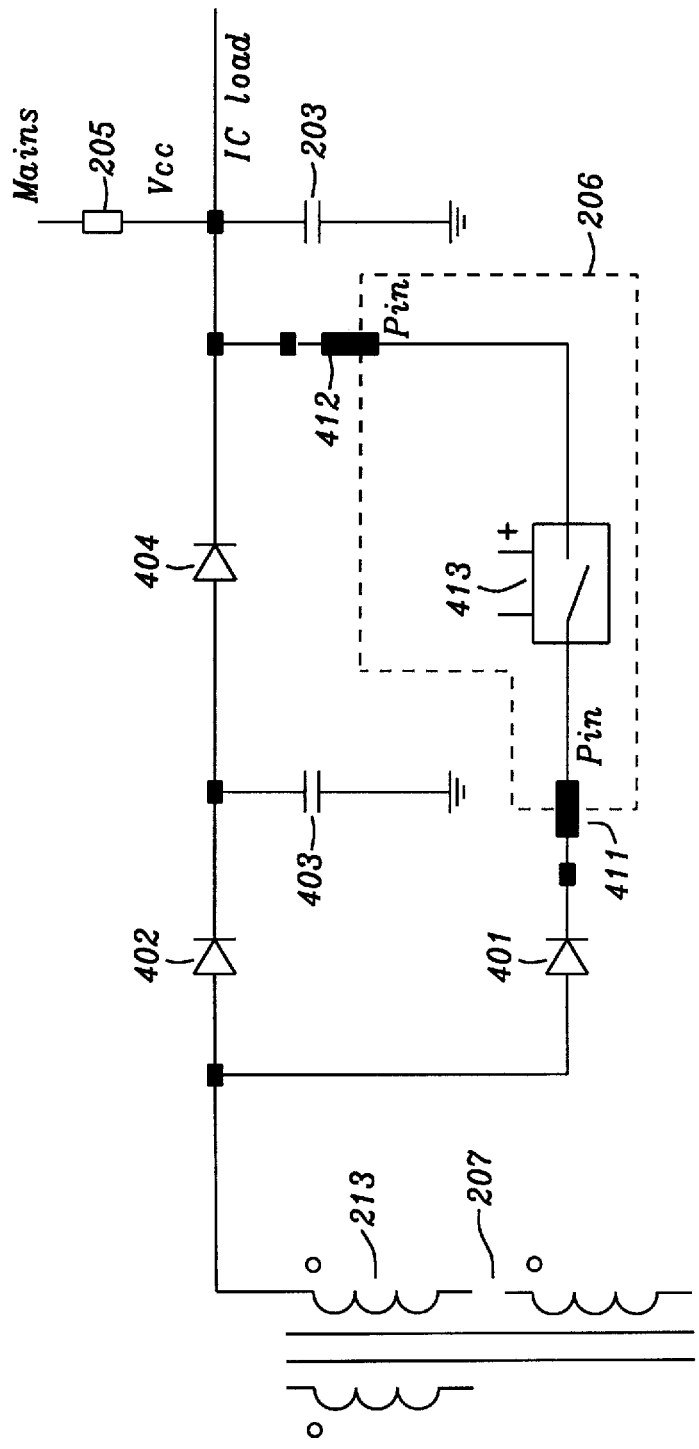
FIGS. 4a and 4b show circuit diagrams of example circuit arrangements comprising a back-up capacitor.

FIG. 4a illustrates an example circuit arrangement comprising a back-up capacitor 403 in addition to the supply voltage capacitor 203. The circuit arrangement of FIG. 4a may be used in the driver circuit 200 of FIG. 2. In a similar manner to the driver circuit 200 of FIG. 2, the supply voltage capacitor 203 may be charged using a start-up resistor 205. Furthermore, the circuit arrangement of FIG. 4a shows the transformer 207 of the flyback converter 222, wherein the transformer 207 comprises an auxiliary winding 213 which may be used for measurement purposes. In the illustrated example, the auxiliary winding 213 is (also) used to charge the back-up capacitor 403. This means that the back-up capacitor 403 is charged via the auxiliary winding 213 once the flyback converter 222 has started operation.

A first diode or switch 402 may be used to prevent a discharging of the back-up capacitor 403 towards the auxiliary winding 213. A second diode or switch 404 (also referred to as back-up switch) may be used to decouple the back-up capacitor 403 from the supply voltage capacitor 203. In particular, the second diode 404 ensures that the back-up capacitor is charged via the start-up resistor 205, which would slow down the start-up process. On the other hand, the second diode 404 allows for a discharging of the back-up capacitor 403 towards the supply voltage capacitor 203, in case the charge within the supply voltage capacitor 203 drops. As such, the back-up capacitor 403 can be used to recharge the supply voltage capacitor 203 in situations where the supply voltage capacitor 203 does not receive energy via the start-up resistor 205 or via some other means, e.g. in situations where the mains voltage 230 is interrupted.

The circuit arrangement of FIG. 4a also illustrates a diode 401 and a switch 413 which may be used to recharge the supply voltage capacitor 203 via the auxiliary winding 213. The switch 413 may be used to control the charging level of the supply voltage capacitor 203 and the diode 401 may be used to prevent a discharging of the supply voltage capacitor 203 towards the auxiliary winding 213. The switch 413 may be an internal switch of the controller 206 and the supply voltage capacitor 203 may be coupled to the controller 206 via pin 412 and the diode 401 may be coupled to the controller 206 via pin 411.

Figure 4B:
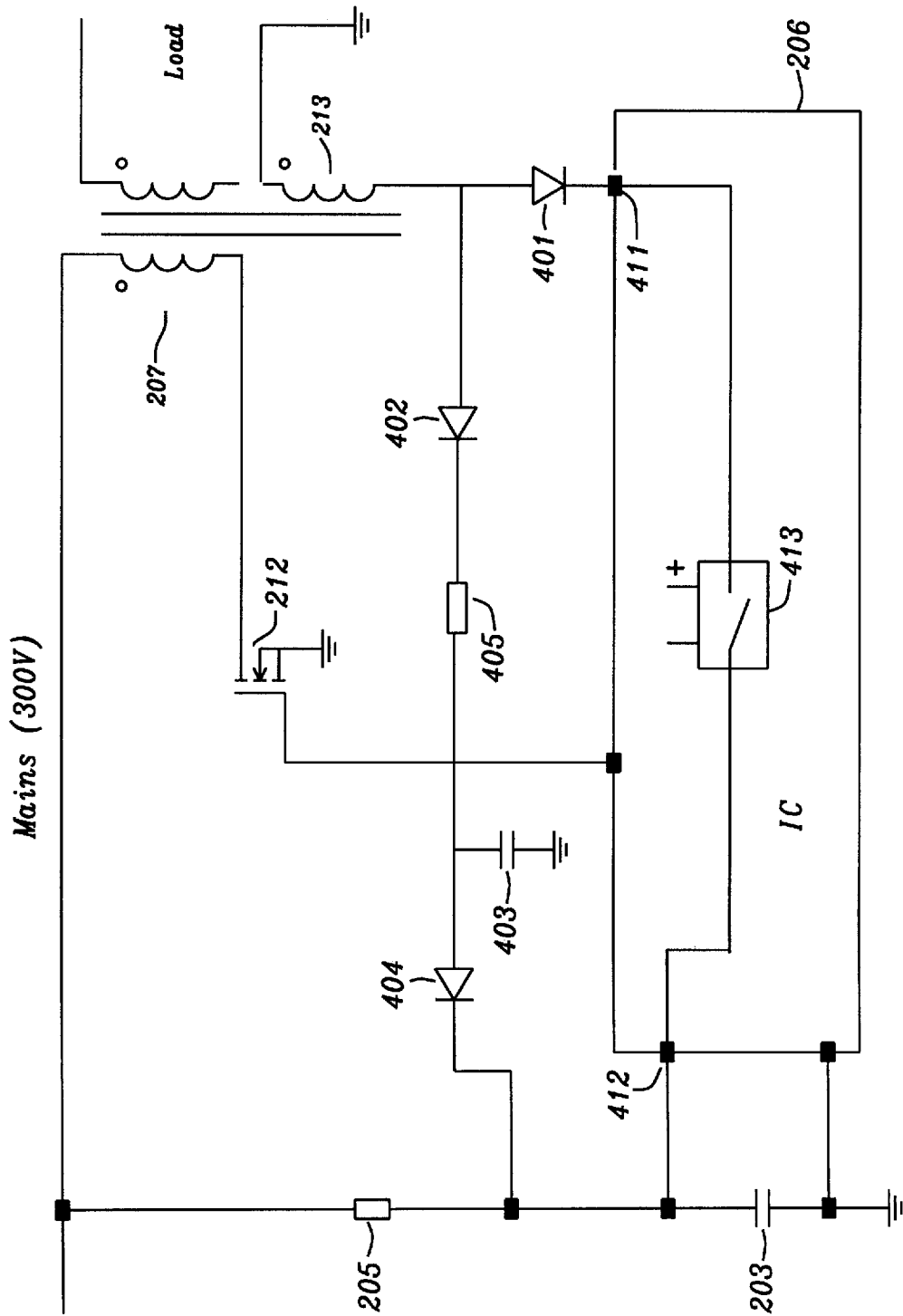

FIG. 4b illustrates a circuit arrangement similar to the circuit arrangement of FIG. 4a. The circuit arrangement of FIG. 4b further illustrates the power switch 212 of the flyback converter 222 of FIG. 2. In addition, the circuit arrangement of FIG. 4b further comprises a back-up resistor 405 which may be used to prevent charge peaks, i.e. which may be used to slow down the charging of the back-up capacitor 403.

The time constant of the start-up resistor 205 and the supply voltage capacitor 203 is typically the limiting factor for the start up time of the controller 206 and of the driver circuit 200. When using an additional back-up capacitor 403, the time constant (in particular the capacitance of the supply voltage capacitor 203) can be selected to be low, thereby enabling a fast start-up of the controller 206 and of the driver circuit 200.

Once the power electronic, i.e. the driver circuit 200, starts to operate, the back-up capacitor 403 will be charged (and recharged). The capacitance of the back-up capacitor 403 can be selected to be relatively large, thereby allowing for the storage of a high amount of energy. In particular, the capacitance of the back-up capacitor 403 may be selected in dependence on the duration of the mains supply interruption which is to be bridged. Using the supply voltage switch 413, also the supply voltage capacitor 403 may be charged/recharged via the auxiliary winding 213.

In normal operation, the second diode 404 decouples the back-up capacitor 403 from the supply voltage capacitor 203. If the voltage at the supply voltage capacitor 203 drops, the stored energy of the back-up capacitor 403 will be used to maintain the supply voltage Vcc. As a consequence, the supply voltage at the Vcc pin of the controller 206 will be maintained longer, thereby prolonging the operation of the controller 206 (which may be implemented e.g. as an integrated circuit, IC). The additional back-up circuit comprising the back-up capacitor 403 and the first and second diodes 402, 404 may be used for applications requiring a slow drop for the supply voltage Vcc (e.g. a drop in the range of seconds). It should be noted that the second diode 404 may be replaced by an active switch (e.g. a transistor).

It should be noted that the first and second diodes 402, 404, as well as the diode 401, may be implemented as active switches, e.g. as transistors such as metal oxide semiconductor field effect transistors. In particular, the diodes may be implemented as (fully) bidirectional switches which are configured to bypass the body diodes typically comprised in transistors. By using switches, the voltage levels in the circuit arrangement can be managed with higher flexibility. By way of example, the voltage at the back-up capacitor 403 may be higher than the supply voltage. Vcc (i.e. higher than the voltage at the supply voltage capacitor). The voltage at the back-up capacitor 403 may be regulated to a reduced voltage using the switch 413 (using the on-resistance Ron of the switch 413). In a similar manner, this can be done by replacing the diode 402 and/or the diode 404 with an active switch. The current flowing between the back-up capacitor 403 and the supply voltage capacitor 203 may be limited using the one or more switches.

The driver circuit 200 is started via the start-up resistor 205 with low current. If the voltage at the supply voltage capacitor 203 is high enough, the controller 206 and the flyback converter 222 start to operate and will provide energy via the secondary winding 213 of the transformer 207. The secondary (or auxiliary) winding 213 (re)charges the supply voltage capacitor 203 via the switch 413. Furthermore, the secondary winding 213 charges the back-up capacitor 403 via the first diode 402 and optionally via the resistor 405. The secondary winding 213 functions as a low impedance AC voltage source. This means that the transformer 207 comprises windings (notably a secondary winding 213) which have a low impedance.

Once the supply voltage capacitor 203 and the back-up capacitor 403 are charged, the total capacitance which is available for maintaining the supply voltage is increased. The benefit is that the controller 206 and the driver circuit 200 can maintain operation for a longer duration subsequent to an interruption of the mains voltage 230.

A driver circuit 200 comprising a relatively small supply voltage capacitor 203 and an additional back-up capacitor 403 may be used to provide the driver voltage 231 and the drive current 232 for a light source 209, thereby enabling a short start-up time (for instantaneous reaction of the light source to an "ON" event from the mains supply). The fast start-up time is provided without the need for an additional (high voltage) start-up transistor which would increase the cost of the driver circuit 200.

Furthermore, the driver circuit 200 allows for the bridging of interruptions of the mains supply. The capacitance of the back-up capacitor 403 may be selected in dependence of the desired duration of the interruption which is to be bridged. As a consequence, the driver circuit 200 (and the controller 206) may be configured to detect "Off/On" events without the risk of an interruption of the operation of the controller 206/driver circuit 200. This enables the implementation of light bulb assemblies 1 which are dimmable using "Off/On" events as outlined in the context of FIG. 3.

Figure 5:
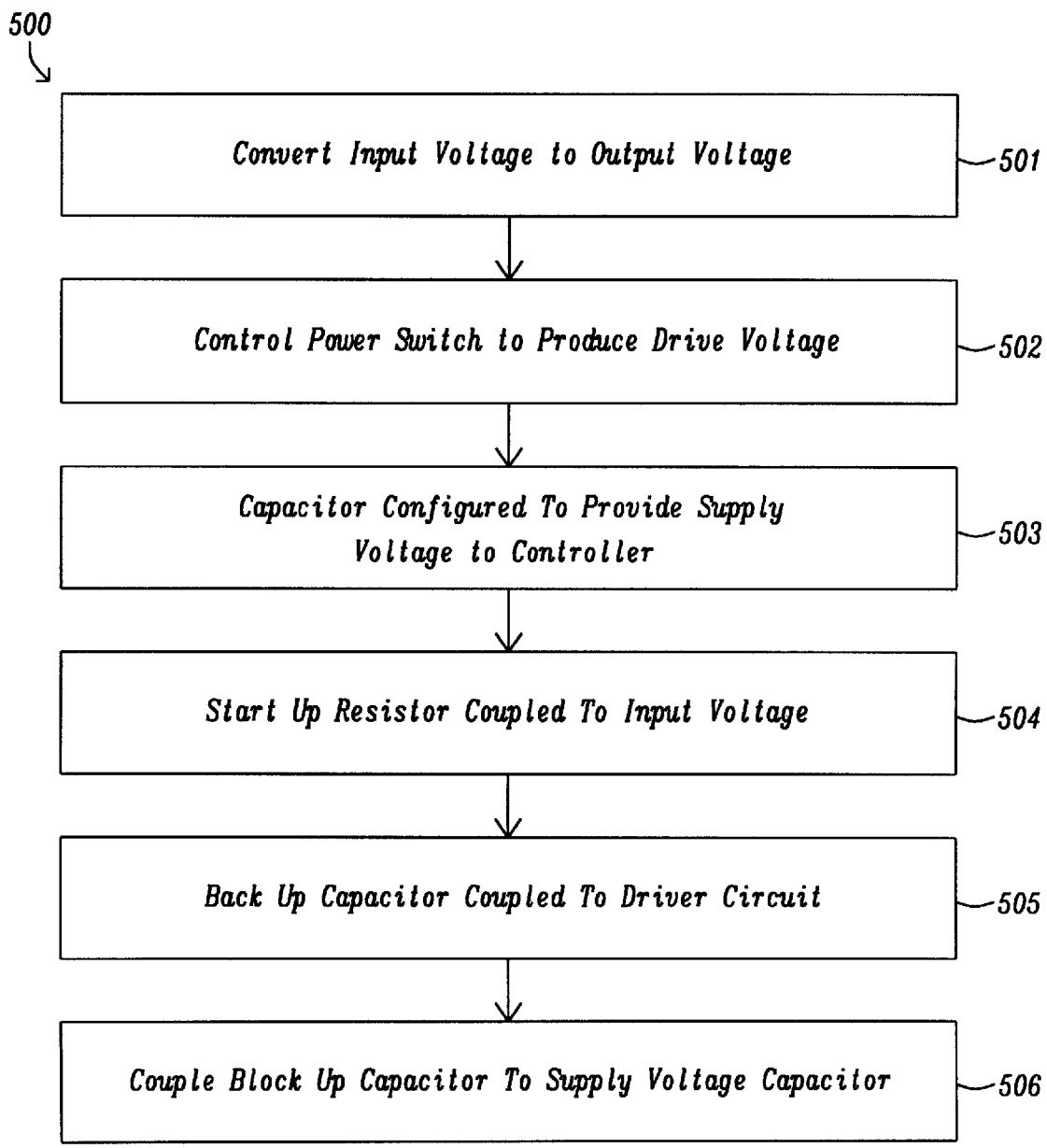
FIG. 5 illustrates a flow chart of an example method for providing short start-up times and prolonged bridging of interruptions.

FIG. 5 illustrates a flow chart of an example method for providing a driver circuit with a short start-up time and a prolonged duration for bridging interruptions of the input voltage. The method 500 comprises converting 501 electrical energy at an input voltage into electrical energy at a drive voltage using a power converter comprising a power switch. The method 500 proceeds in controlling 502 the power switch such that the electrical energy at the drive voltage is provided. Furthermore, the method 500 comprises providing 503 a supply voltage capacitor coupled to a controller and configured to provide a supply voltage to the controller. In addition, the method 500 comprises providing 504 a start-up resistor coupled to the input voltage and configured to charge the supply voltage capacitor when coupled to the supply voltage capacitor. The start-up resistor may be coupled to the supply voltage capacitor during a start-up phase. Furthermore, the method 500 comprises providing 505 a back-up capacitor coupled to the output of the driver circuit and arranged to receive electrical energy from the output of the driver circuit. The method 500 may proceed in coupling 506 the back-up capacitor with the supply voltage capacitor if a voltage at the back-up capacitor exceeds the supply voltage by a forward voltage threshold; and/or in decoupling 506 the back-up capacitor from the supply voltage capacitor if the supply voltage exceeds the voltage at the back-up capacitor by a reverse voltage threshold.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A driver circuit configured to provide, at an output of the driver circuit, electrical energy at a drive voltage, derived from electrical energy at an input voltage at an input of the driver circuit, the driver circuit comprising:
    a power converter configured to convert the electrical energy at the input voltage into the electrical energy at the drive voltage, wherein the power converter comprises a power switch;
    a controller configured to control the power switch such that the power converter provides the electrical energy at the drive voltage;
    a supply voltage capacitor coupled to the controller and configured to provide a supply voltage to the controller;
    a start up resistor coupled to the input of the driver circuit and configured to charge the supply voltage capacitor when coupled to the supply voltage capacitor, wherein the start up resistor is coupled to the supply voltage capacitor during a start up phase of the driver circuit;
    a back-up capacitor coupled to the output of the driver circuit and arranged to receive electrical energy from the output of the driver circuit; and
    a back-up switch configured to couple the back-up capacitor with the supply voltage capacitor if a voltage at the back-up capacitor exceeds the supply voltage by a forward voltage threshold, and configured to decouple the back-up capacitor from the supply voltage capacitor if the supply voltage exceeds the voltage at the back-up capacitor by a reverse voltage threshold.

2. The driver circuit of claim 1, wherein:
    the power converter comprises a transformer configured to galvanically decouple the electrical energy at the input voltage from the electrical energy at the drive voltage using an electromagnetically coupled primary and secondary winding;
    the transformer comprises an auxiliary winding which is electromagnetically coupled with the primary winding of the transformer; and
    the backup capacitor is coupled to the auxiliary winding.

3. The driver circuit of claim 2 wherein the back-up capacitor is coupled to the auxiliary winding by means of a first discharging switch configured to prevent discharging of the back-up capacitor via the auxiliary winding.

4. The driver circuit of claim 3 wherein the first discharging switch comprises a first discharge diode.

5. The driver circuit of claim 2 wherein:
    the supply voltage capacitor is coupled to the auxiliary winding using a supply voltage switch configured to control a charging level of the supply voltage capacitor; and/or
    the supply voltage capacitor is coupled to the auxiliary winding using a second discharging switch comprising a second discharging switch configured to prevent a discharging of the supply voltage capacitor by means of the auxiliary winding.

6. The driver circuit of claim 5 wherein the supply voltage switch is an internal switch of the controller.

7. The driver circuit of claim 2 wherein the second discharging switch comprises a second discharging diode.

8. The driver circuit of claim 1 wherein the power converter comprises:
    a switched-mode power converter, and/or
    a plurality of converter stages; and/or
    one or more of a boost converter, a buck converter, a buck-boost converter, a SEPIC converter, a flyback converter.

9. The driver circuit of claim 1, wherein the input voltage corresponds to a rectified mains voltage.

10. The driver circuit of claim 1, wherein the back-up switch comprises a diode which is forward biased if the voltage at the back-up capacitor exceeds the supply voltage and reverse biased if the supply voltage exceeds the voltage at the back-up capacitor.

11. The driver circuit of claim 1, wherein:
    the controller comprises a start-up switch;
    the controller is configured to close the start-up switch during the start-up phase, in order to couple the start-up resistor to the supply voltage capacitor; and
    the controller is configured to open the start-up switch subsequent to the start-up phase, in order to decouple the start-up resistor from the supply voltage capacitor.

12. The driver circuit of claim 1, wherein:
    the driver circuit is configured to provide the electrical energy at the drive voltage to a solid state lighting light source; and
    the controller is configured to operate the power converter according to a plurality of different operation states corresponding to a plurality of different illumination states of the light source.

13. The driver circuit of claim 12, wherein the controller is configured to:
    operate the driver circuit according to a current operation state;
    detect one of a plurality of pre-determined events based on the input voltage;
    determine a target operation state in accordance to a pre-determined state machine, based on the current operation state and the detected one of the plurality of pre-determined events; and
    operate the driver circuit in accordance to the target operation state.

14. The driver circuit of claim 13, wherein:
    the plurality of pre-determined events comprises an "off" event, an "off/on" event and an "on" event;
    detecting the "off" event comprises detecting that the input voltage lies below a pre-determined off-threshold for more than a pre-determined maximum time threshold;
    detecting the "off/on" event comprises detecting that the input voltage lies below the pre-determined off-threshold for more than a pre-determined minimum time threshold and for less than the pre determined maximum time threshold; and detecting the "on" event comprises detecting that the input voltage lies above a pre-determined on-threshold.

15. The driver circuit of claim 1, further comprising an output capacitor at the output of the driver circuit, configured to store an electrical charge to be provided to a load of the driver circuit, wherein the driver circuit is configured to transfer electrical energy from an inductor of the power converter to the output capacitor during an off-state of the power switch.

16. The driver circuit of claim 1, further comprising a light source connected to an output of the driver circuit providing electrical energy at the drive voltage.

17. A method to provide electrical energy at a drive voltage derived from electrical energy at an input voltage, the method comprising:
   providing electrical energy at the input voltage at an input of a driver circuit;
   converting the electrical energy at the input voltage to electrical energy at the drive voltage using a power switch;
   controlling the power switch such that the electrical energy at the drive voltage is provided;
   providing a supply voltage capacitor coupled to a controller and configured to provide a supply voltage to the controller;
   providing a start up resistor coupled to the input voltage and configured to charge the supply voltage capacitor when coupled to the supply voltage capacitor, wherein the start up resistor is coupled to the supply voltage capacitor during a start-up phase;
   providing a back-up capacitor coupled to the output of the driver circuit and arranged to receive electrical energy from the output of the driver circuit;
   coupling the back-up capacitor with the supply voltage capacitor if a voltage at the back-up capacitor exceeds the supply voltage by a forward voltage threshold; and
   decoupling the back-up capacitor from the supply voltage capacitor if the supply voltage exceeds the voltage at the back-up capacitor by a reverse threshold.

18. The method of claim 17 wherein the power switch is part of a power converter comprising a transformer.

19. The method of claim 18 wherein the transformer is configured to galvanically decouple the electrical energy at the input voltage from the electrical energy at the drive voltage using electromagnetically coupled primary and secondary windings.

20. The method of claim 18 wherein the transformer further comprises an auxiliary winding which is electromagnetically coupled with the primary winding of the transformer.

21. The method of claim 20 wherein the auxiliary winding is coupled with the back-up capacitor.

* * * * *